(12) United States Patent
Ciano et al.

(10) Patent No.: US 11,157,394 B2
(45) Date of Patent: Oct. 26, 2021

(54) EXCEPTION CAUSE ANALYSIS DURING COMPUTER PROGRAM EXECUTION

(71) Applicant: International Business Machines Corporation, Armonk, NY (US)

(72) Inventors: Giuseppe Ciano, Rome (IT); Marco Martino, Rome (IT); Salvatore D'Angelo, Sarno (IT); Valeria Perticara', Rome (IT); Roberto Giordani, Rome (IT); Roberto Piras, Rome (IT); Angelo Albanese, Rome (IT); Gianluca Bernardini, Guidonia (IT)

(73) Assignee: International Business Machines Corporation, Armonk, NY (US)

(*) Notice: Subject to any disclaimer, the term of this patent is extended or adjusted under 35 U.S.C. 154(b) by 12 days.

(21) Appl. No.: 16/292,668

(22) Filed: Mar. 5, 2019

(65) Prior Publication Data

US 2020/0285564 A1    Sep. 10, 2020

(51) Int. Cl.
  *G06F 9/44*    (2018.01)
  *G06F 9/445*   (2018.01)
  *G06F 11/36*   (2006.01)
  *G06K 9/62*    (2006.01)
  *G06N 5/02*    (2006.01)
  *G06F 8/71*    (2018.01)

(52) U.S. Cl.
  CPC ............ *G06F 11/3664* (2013.01); *G06F 8/71* (2013.01); *G06K 9/6215* (2013.01); *G06N 5/02* (2013.01)

(58) Field of Classification Search
  CPC ..... G06F 11/3664; G06F 8/71; G06K 9/6215; G06N 5/02
  See application file for complete search history.

(56) References Cited

U.S. PATENT DOCUMENTS

| 7,100,083 | B2 * | 8/2006 | Little | G06F 11/2257 714/26 |
| 7,490,073 | B1 * | 2/2009 | Qureshi | G06F 11/079 706/50 |
| 7,685,570 | B2 | 3/2010 | Draine et al. | |
| 8,122,366 | B2 | 2/2012 | Harrold et al. | |

(Continued)

OTHER PUBLICATIONS

Benoit Cornu, Automatic Analysis and Repair of Exception Bugs for Java Programs, 2016, pp. 1-104. https://tel.archives-ouvertes.fr/tel-01250092/document (Year: 2016).*

(Continued)

*Primary Examiner* — Mongbao Nguyen
(74) *Attorney, Agent, or Firm* — Nolan M. Lawrence (57) ABSTRACT

A method for cause analysis of a configuration exception occurred during the execution of a computer program on a programmable computer. The method includes executing the program on the computer. Exception information associated with the configuration exception may be extracted. The method may use context information and circumstances under which the configuration exception occurred. The method may also use data indicative of experiences of other developers that had a similar exception. A set of possible causes may be looked up from a knowledge base; wherein looking up the set of possible causes is based on context information related to the computer program.

20 Claims, 4 Drawing Sheets

(56) References Cited

U.S. PATENT DOCUMENTS

| | | | |
|---|---|---|---|
| 9,047,164 B2* | 6/2015 | Jain | G06F 11/3672 |
| 9,286,035 B2* | 3/2016 | Sundararam | G06F 11/3604 |
| 9,804,950 B2 | 10/2017 | Bhogal et al. | |
| 10,572,245 B1* | 2/2020 | Doebel | G06F 8/65 |
| 2008/0244325 A1 | 10/2008 | Tyulenev | |
| 2009/0006883 A1 | 1/2009 | Zhang et al. | |
| 2014/0372346 A1* | 12/2014 | Phillipps | G06N 20/00 |
| | | | 706/12 |
| 2015/0033202 A1* | 1/2015 | Wilson | G06F 8/43 |
| | | | 717/106 |
| 2015/0088834 A1* | 3/2015 | Wright, Sr. | G06F 16/2379 |
| | | | 707/689 |
| 2015/0378861 A1* | 12/2015 | Deshpande | G06F 11/3409 |
| | | | 717/131 |
| 2017/0060546 A1* | 3/2017 | Prasad | G06F 8/71 |
| 2017/0116108 A1* | 4/2017 | Miskelly | G06F 11/3624 |
| 2017/0237646 A1* | 8/2017 | Fabjanski | G06F 8/61 |
| | | | 709/224 |
| 2017/0262361 A1* | 9/2017 | Francis | G06F 11/3672 |
| 2017/0344345 A1* | 11/2017 | Fan | G06F 8/30 |
| 2017/0344460 A1 | 11/2017 | Hartinger et al. | |
| 2017/0344461 A1 | 11/2017 | Hartinger et al. | |
| 2018/0246801 A1* | 8/2018 | Krauss | G06F 11/3612 |
| 2018/0276103 A1* | 9/2018 | Woulfe | G06F 11/362 |
| 2019/0108001 A1* | 4/2019 | Hauser | G06F 11/3604 |
| 2019/0243633 A1* | 8/2019 | Miyauchi | H04L 12/4015 |
| 2019/0324893 A1* | 10/2019 | Vaishnav | G06F 11/3612 |
| 2019/0332722 A1* | 10/2019 | Ogren | G06F 16/9024 |
| 2019/0370347 A1* | 12/2019 | Levy | G06F 17/17 |
| 2020/0034282 A1* | 1/2020 | He | G06F 11/3684 |
| 2020/0073686 A1* | 3/2020 | Hanke | G06F 16/95 |
| 2020/0089485 A1* | 3/2020 | Sobran | G06F 8/65 |
| 2020/0097389 A1* | 3/2020 | Smith | G06K 9/6256 |
| 2021/0042108 A1* | 2/2021 | Suarez | G06F 21/53 |

OTHER PUBLICATIONS

Simon Caton, Dynamic Model Evaluation to Accelerate Distributed Machine Learning, 2018, pp. 150-157. https://ieeexplore.ieee.org/stamp/stamp.jsp?tp=&arnumber=8457743&isnumber=8457596 (Year: 2018).*

Chui-Hui Chiu, An Effective Distributed GHSOM Algorithm for Unsupervised Clustering on Big Data, 2017, pp. 297-303. https://ieeexplore.ieee.org/stamp/stamp.jsp?tp=&arnumber=8029338&isnumber=8029291 (Year: 2017).*

Pei et al., "Automated Program Repair in an Integrated Development Environment", 2015 IEEE/ACM 37th IEEE International Conference on Software Engineering, 4 pages, © 2015 IEEE.

Mannila et al., "Similarity of Even Sequences", Extended Abstract, Oct. 1998, University of Helsinki, Department of Computer Science, 4 pages.

"Levenshtein distance", From Wikipedia, the free encyclopedia, printed Jan. 10, 2019, 7 pages, https://en.wikipedia.org/wiki/Levenshtein_distance.

* cited by examiner

EXCEPTION CAUSE ANALYSIS DURING COMPUTER PROGRAM EXECUTION

BACKGROUND

The present disclosure relates to the field of digital computer systems, and more specifically, to a method for cause analysis of a configuration exception occurred during the execution of a computer program.

Handling configuration exceptions and errors in a software project in particular large software projects is a technical challenge. A proper diagnose and resolution of issues goes beyond a traditional ad-hoc screening of software codes as multiple local and remote sources may affect the problem.

SUMMARY

Various embodiments provide a method, system, and computer program product for cause analysis of a configuration exception occurred during the execution of a computer program as described by the subject matter of the independent claims. Further embodiments are described in the dependent claims. Embodiments of the present disclosure can be freely combined with each other.

In one aspect, the disclosure relates to a method for cause analysis of a configuration exception occurred during the execution of a computer program on a programmable computer. The method comprises: executing the program on the computer; extracting exception information associated with the configuration exception; and looking up a set of possible causes from a knowledge base; wherein looking up the set of possible causes is based on context information related to the computer program.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system for cause analysis of a configuration exception occurred during the execution of a computer program on the computer system. The computer system is configured for: executing the program on the computer; extracting exception information associated with the configuration exception; and looking up a set of possible causes from a knowledge base; wherein looking up the set of possible causes is based on context information related to the computer program.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer systems, more particular aspects relate to cause analysis of a configuration exception occurred during the execution of a computer program. While the present disclosure is not necessarily limited to such applications, various aspects of the disclosure may be appreciated through a discussion of various examples using this context.

The descriptions of the various embodiments of the present disclosure will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure may provide a single point solution for software exceptions. This may save processing resources that would otherwise be required for involving multiple systems and users each time a configuration exception occurs. The present method may speed up the process of fixing or solving software execution problems in a development environment. This may save processing resources that would otherwise be required by ad-hoc attempts to solve a problem. The present method may further be advantageous, because the usage of both the exception information and context information may increase the reliability and accuracy of the fixing process. The method may be able to understand the context and circumstances under which the configuration problem occurred and the recent developer actions that could have an impact on the issue. The method may also be able to leverage experiences of others developers that had the same problem.

The configuration exception may be an anomalous or exceptional condition which interrupts the normal flow of program execution by a processor of the computer program. The configuration exception may for example include a trap or abort or build problem e.g., due to a missing library.

The exception information may be indicative of the configuration exception. For example, the exception information may comprise an error message that is generated by the system that executes the computer program. The exception information may indicate the source of the configuration exception such as a line number of the program code and method name which has generated the configuration exception.

The context information may for example be indicative of the development environment of the computer program. The development environment may for example be a computer system in which the computer program is deployed and executed and/or development tools used to execute the computer program. The development tools may comprise a compiler, integrated development environment, different versions of libraries and support software, etc., which are present in the computer system or which are not present e.g., external tools.

According to one embodiment, the context information comprises at least one of characteristic of an execution environment where the computer program is executed, characteristic of a development environment applied to generate the computer program, or code of the computer program. This may enable a precise and detailed characterization of the computer program which may enable an identification of a reliable and right solution to the configuration exception.

According to one embodiment, the context information comprises change information, the change information describing at least one change carried out on the execution or development environment or on code of the computer program. The change information may for example comprise changes recorded from the point of time at which the computer program is successfully executed. The change information may enable isolation of the source of the configuration exception and thus may further increase the speed of identifying the root cause of the configuration exception.

According to one embodiment, looking up the set of possible causes comprises calculating a first similarity metric from the context information related to the computer program and further context information stored in the knowledge base and associated with a possible cause stored in the knowledge base. Similarity metrics may enable an automatic and systematic identification of the root causes. This may further speed up the identifying of the root cause of the configuration exception. The first similarity metric may be a Levenshtein distance. A cognitive system may, for example, be used to calculate the first similarity metric. The cognitive system may for example isolate a part of a configuration such as a dependency tree for a Java program to better focus on the configuration part that caused the issue. Unsupervised learning with clustering can be used to associate similar configuration problems that caused the same issue.

According to one embodiment, looking up the possible causes comprises calculating a second similarity metric from the extracted exception information and further exception information stored in the knowledge base and associated with a possible cause stored in the knowledge base. A root cause may be selected based on the values of the first and second metrics. For example, if the first and second similarity metrics fulfill a predefined similarity condition the respective root cause is selected. This may enable to identify accurate root causes.

According to embodiments, multiple similarity metrics may have different weights or valuations as to their relevance of a given error. For example, if a developer is developing in a first coding language, then the version of the first coding language (a first similarity metric) could be given a larger weight than an operating system (a second similarity metric). Continuing the example, the first similarity metric may be given a weighting factor of '0.7' and the second similarity metric may be given a weighting factor of '0.4' such that the development environment would be given more importance in determining the cause of the error and the similarity to previous errors and related solutions. The metrics may be in a variety of categories. A code category includes developer actions (e.g., source code written by a developer after a last known successful execution of the code). An environment category includes context actions (e.g., the version of a tool, operating system, driver, or hardware that was changed after a last execution of the code). A product category includes scenario actions (e.g., a specific set or order of operations performed for a known good execution, a specific set or order of operations performed that resulted in an error). Product categories may be recorded by recording operation of a computer (e.g., recording recent history or program executions, prior states of a computer).

According to one embodiment, the exception information comprises a character string and calculating the second similarity metric comprise determining a string similarity. This may particularly be advantageous as the exception log messages generated by different systems may be similar.

Advantages of utilizing embodiments include advantages over existing solutions to errors that occur in software development. Often, software development questions must be solved haphazardly by asking other users or searching for a solution. During the searching and asking process, many tedious questions may be asked (e.g., what did you do, what type of software is installed, when did you last get it to work successfully). Conversely, and according to embodiments, advantageously before an error occurs the configuration of the development environment and the actions of the user in the time before the error occurs may be collected. The collected development environment may include any tools installed (and the version of the installed tools), the type of hardware (e.g., memory, processor), and the version of the operating system. Further, these collected information can be stored across many developers along with errors that occur as a result of the collected information. Though this may seem unintuitive and opposite of other techniques, precollecting this type of information can enable real-time and automatic calculation (alternatively, precalculation) of solutions for errors based on sequences of activities of the user and development environment, along with the configuration and any recent change of the environment. These errors may be automatically calculated by continuous and/or repeated comparison with past errors and their root causes, and consequently, solutions to the past errors. These errors and solutions can be not only presented to the user, but also ranked such that a user can quickly analyze the proposed solutions and select the most relevant and expedient fix.

Figure 1:
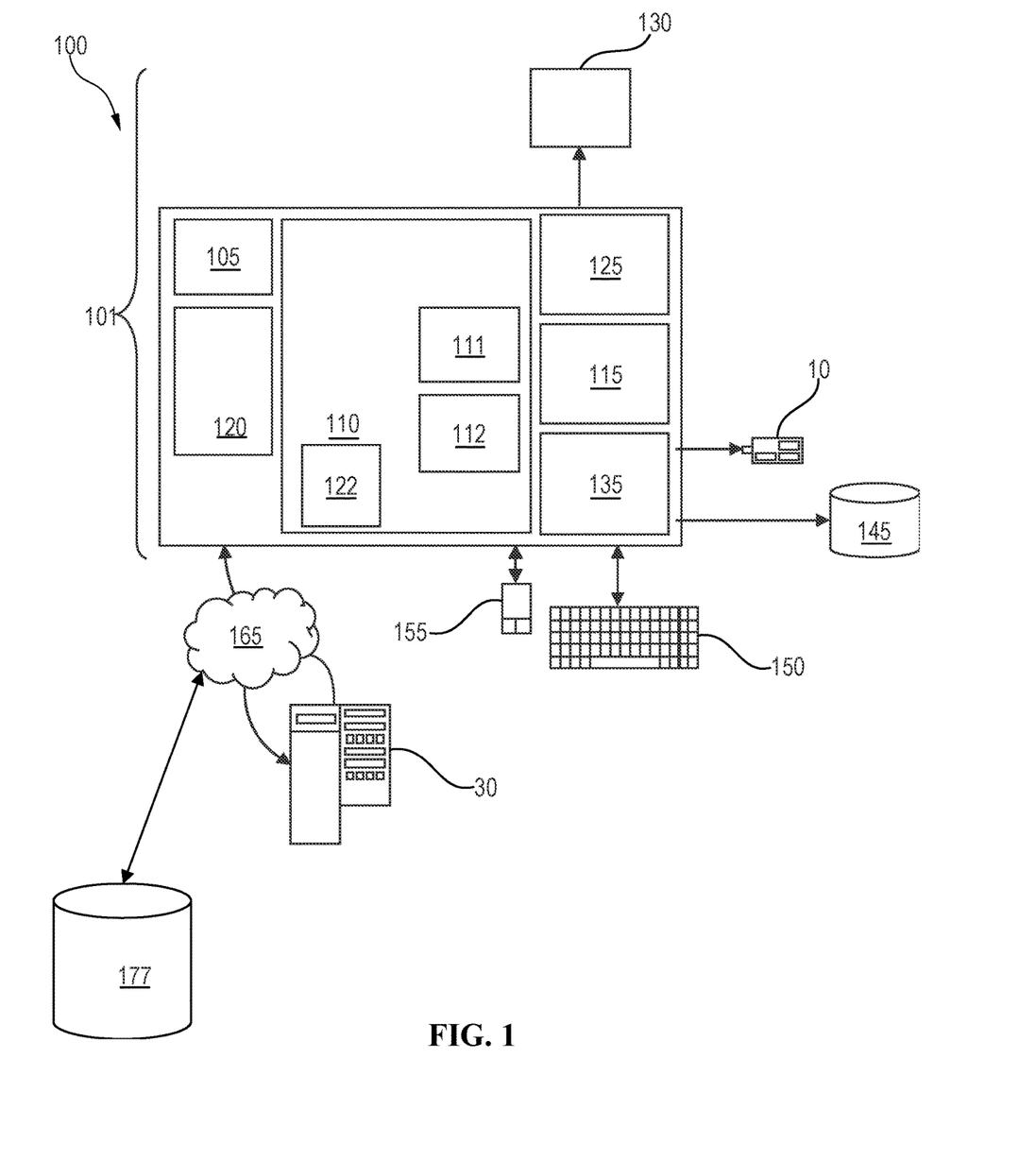
FIG. 1 represents a computerized system, suited for implementing one or more method steps as involved in the present disclosure.

FIG. 1 represents a general computerized system, suited for implementing method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor-based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions 112 e.g., instructions to manage databases such as a database management system.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object-oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, a storage device, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The computer 101 may be configured to access data stored in a knowledge base 177. The access to the knowledge base 177 may for example be performed via network 165.

Figure 2:
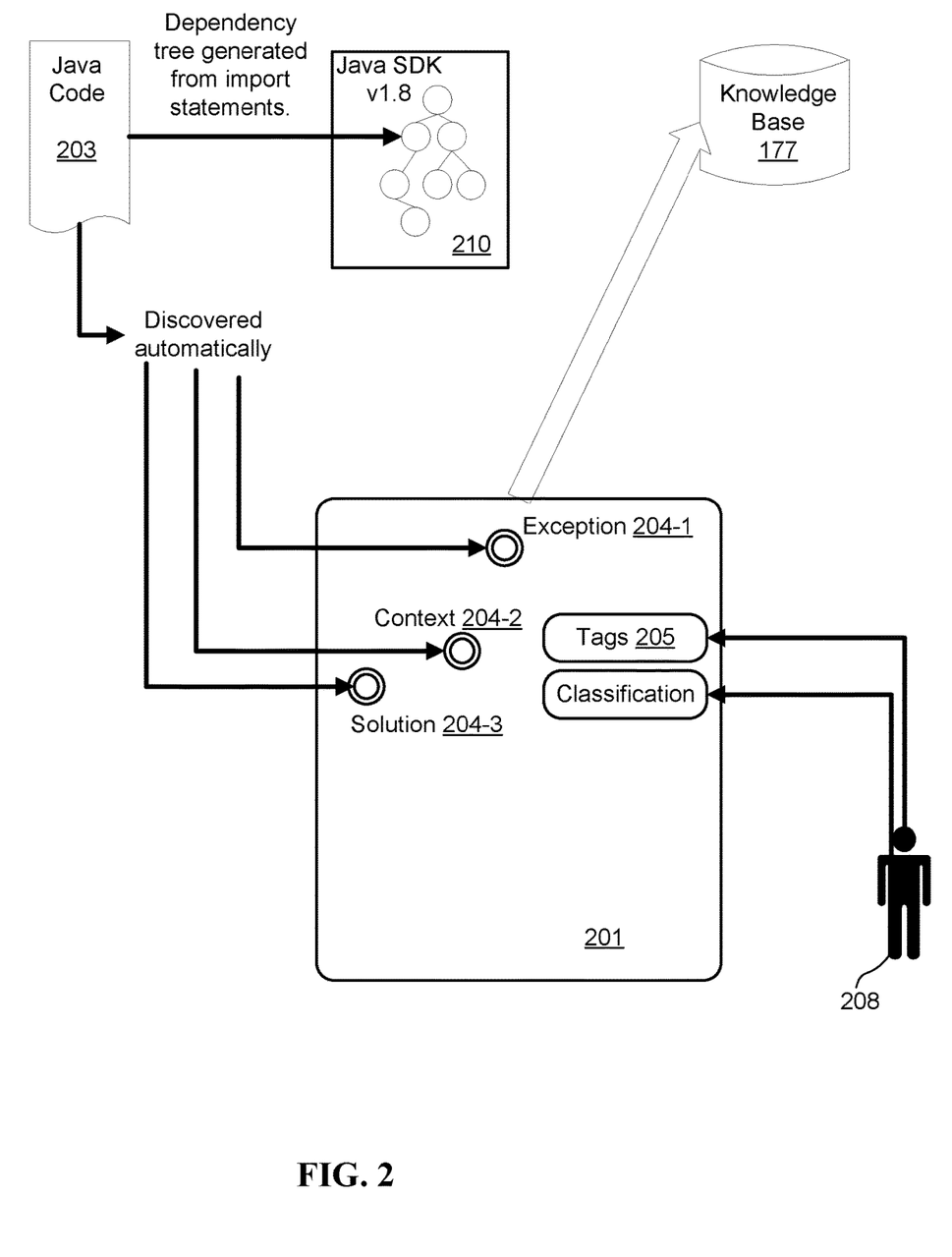
FIG. 2 depicts a diagram illustrating a method for building a knowledge base in accordance with the present disclosure.

FIG. 2 is a diagram illustrating a method for building a knowledge base e.g., 177, in accordance with the present disclosure.

The knowledge base 177 may for example be populated with entries of one or more software development environments. The knowledge base may be accessed through a remote platform (e.g., website, forum, internet connected smartphone app). A development environment may for example comprise an integrated development environment (IDE) system 201 and a set of tools (e.g., tools for build, unit test, code management, etc.), wherein each tool of the set may have a specific version (e.g., version 1.8 of the Java software development kit). The IDE system may for example comprise an IDE plugin.

The IDE system 201 may be configured to determine, for a software code of the development environment, information such as context information 204-2, action information and exception information 204-1. This information (collectively referred to as 204) may for example be determined during the development cycle through events generated by developer actions. In another example, this information 204 may be determined in response to detecting a configuration exception for a running of software code, such as the software code 203 depicted in FIG. 2. The configuration exception may break the normal flow of execution of the software code 203. The determined information 204 may be enriched or augmented by tags 205. The tags 205 may further describe or indicate the problem of the execution of the software code 203. For example, the information 204 (e.g., context information) may automatically be determined or detected by the IDE system 201 and enriched with tags that are automatically detected. The tags 205 may, in another example, be provided by a user 208 e.g., developer. The tags 205 may be time dependent. For example, an entry of context information 204-2, may be associated with a set of time dependent tags t1 . . . tn.

The exception information 204-1 may, for example, indicate an error or exception that occurred when executing the software code 203. The context information 204-2 may, for example, indicate the hardware and software context used for executing the software code 203 at the time a configuration exception occurred. The action information may, for example, indicate code changes of the software code. This may for example help to find the piece of code that generated a problem during execution of the software code 203 (e.g., the action information may indicate if a developer starts using a new API). For example, the IDE system 201 may keep track of code changes that occurred from a last successful run of the software code to isolate the piece of code change that impacted the issue.

For obtaining the context information 204-2, the IDE system 201 may be configured to determine characteristics of the development environment and the operating environment for one or more software codes 203. For example, the IDE system 201 may be configured to keep track of a list of the tools that will be part of the information required to research a software exception resolution for the software code 203. For example, if the software code 203 is a piece of code in Java there might be no need to list Ruby dependencies or system libraries because Java is platform independent. In more detail, for Java, the version of SDK may be more important than the operating system associated with the software code 203, because Java may be platform independent.

For determining the action information, the IDE system 201 may further be configured to keep tracks of the code changes that are periodically inserted by a developer. These changes may enable to isolate the one change that introduced the issue. For example, the IDE system 201 may keep track of code changes from a last successful build run of a software code. This may make it easier to concentrate only on the piece of code that is concerned with bug resolution. To track changes of code, a dependency manager may be used, and in some embodiments a dependency manager for each programming language used for the software code 203. For example, the IDE system 201 may make use of a dependency graph 210 of the SDK used for developing the software code 203 and the dependency tree 210 effectively used for the software code.

The action information may be advantageous as explained with the following example. For example, a Java application, that uses Maven as a build system, is being developed. The Java application uses a project object model (POM) file which is an XML file that contains information (such as library versions) about the project and configuration details used by Maven to build the project. In a given day X, the Java application works fine because it uses a 3.5 library. However, a next day it fails because the system downloaded a new shipped 3.6 library containing a bug. The bug may have no issue. The bug may be a compatibility with specifics of the POM file and version 3.6, but may be fixable by modifying the POM. Next day, when a failure occurs, the developer can quickly check what changed compared to yesterday run in accordance with the present method. The IDE system may immediately find the use of the new library and modify the POM file to use 3.6 version.

The IDE system 201 may further be configured to detect the operating environment such as the hardware and software configuration that is outside the scope of the development environment (e.g., developer acts). For example, when a developer works on a Linux system and updates a system library that causes an issue with Java SDK, and if the day before the Java code worked fine and the next day it failed with only this change, it can be listed as possible cause if other causes cannot be found in the knowledge base.

The combination of the determined operating and development environment may be stored in the knowledge base 177 in association with one or more solutions that contain the root cause of the execution problem of a software code. For example, whenever a developer chooses the right resolution for him, the IDE system 201 may learn that solution (e.g., using a supervised learning algorithm). A solution may, for example, require a download of a missing dependency. For example, when a developer chooses the good fix for his problem the system can reinforce the association between the tuple (Exception, Context, Tags) and the solution that fixes the issue so that if a similar thing occurs in the future the system can react accordingly based on the learning performed by the system.

For example, the information and associated tags may be stored on a persistent object like files (e.g., YAML file) or database. For example, each problem in the knowledge base 177 may be represented by a tuple (E, C, tags) that is associated to a solution S that contains the root cause of the issue E. E refers to an exception and C refers to context information of the exception. The tags may help to provide a better result when searching the knowledge base 177. For example, two very similar tuples like (E1, C1, tags 1) and (E2, C2, tags 2) could have the same solution S. If for example, two tuples occurred on different platform (in this case C is a little bit different) the bug can be marked with "platform independent" tag and it could be possible that same bug can occurs on a new platform too. Other possible tags could be related to the technology (e.g., windows, java, python), classification (e.g., missing library, etc.). The knowledge base can evolve with time depending on how it is used by users. With time each tuple (E, C) will have a set of associated tags t1 . . . to that will be used for a better bug resolution decision.

In future iterations, the IDE system 201 can use the information and associated tags to provide a solution 204-3. The provided solution 204-3 may include the sequence of events to generate the issue and the sequence of events to solve it. The provided solution 204-3 may be provided automatically and substantially concurrently with the error. The provided solution 204-3 may be based on the tuples and tags as well as confidence levels of machine learning or other relevant artificial intelligence processing. Subsequent iteration may improve the provided solutions 204-3 as more information and confirmation (sometimes provided by user 208) improve the confidence level of solutions.

Figure 3:
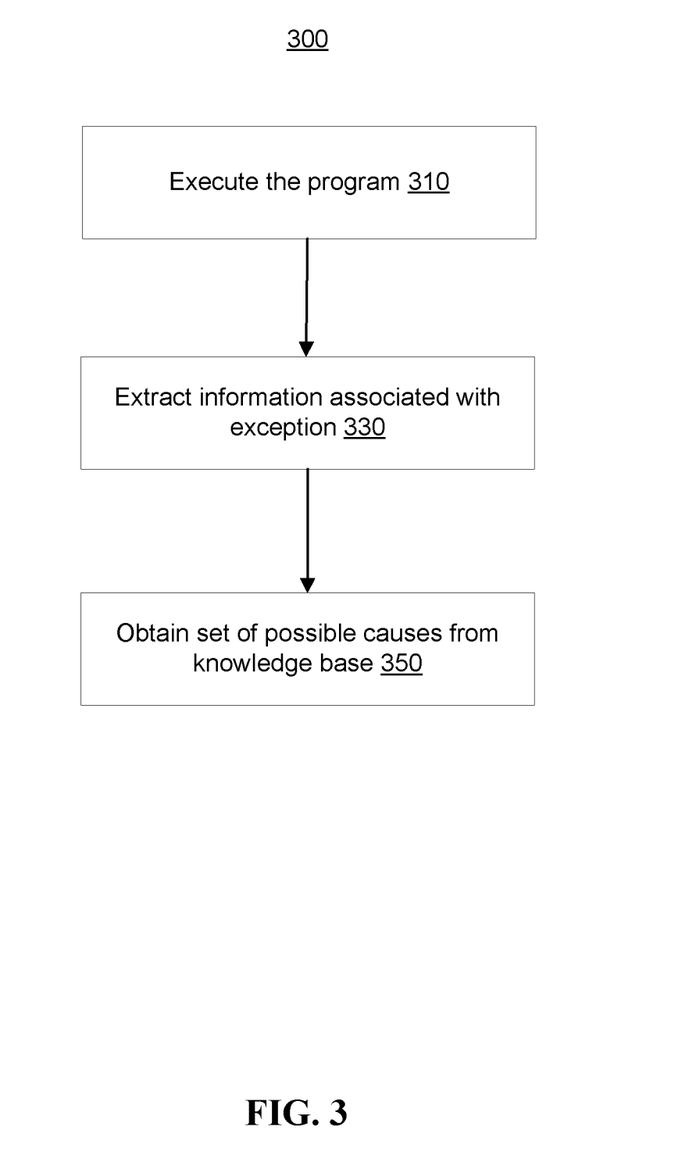
FIG. 3 is a flowchart of a method for cause analysis of an exception occurred during the execution of a computer program.

FIG. 3 is a flowchart of a method 300 for cause analysis of a configuration exception that has occurred during the execution of a computer program.

In step 310, the computer program may be executed on a computer e.g., 101. During the execution of the computer program a configuration exception may occur.

In response to detecting a configuration exception, exception information associated with the configuration exception may be determined in step 330.

Context information of the computer program may further be determined in step 330. The context information of the computer program may be determined as described with reference to FIG. 2.

Using, in step 350, the determined exception information and context information, a set of possible causes may be looked up from or searched in or otherwise obtained. The determined information may be obtained, in step 350, from a knowledge based (e.g., knowledge base 177). For example, the determined context Ccurrent and exception information Ecurrent may be compared with existing tuples (E, C) of the knowledge base 177. This may for example be performed by using a similarity measure between the (Ecurrent, Ccurrent) and each tuple (E, C) of the knowledge base 177. Using a similarity function, a set of solutions S1, ... , Sn may be found and a developer can decide to apply at least one of solutions on its own system. For example, when developing an application and during unit test, an exception for a configuration issue occurs. The present method may automatically show to the user a dialog box reporting or showing one or more possible root causes with a ranking. The root causes may be browsed for details of the root causes. In some embodiments, the root causes may be accompanied with solutions, and a developer may select for the solution to be automatically applied.

Figure 4:
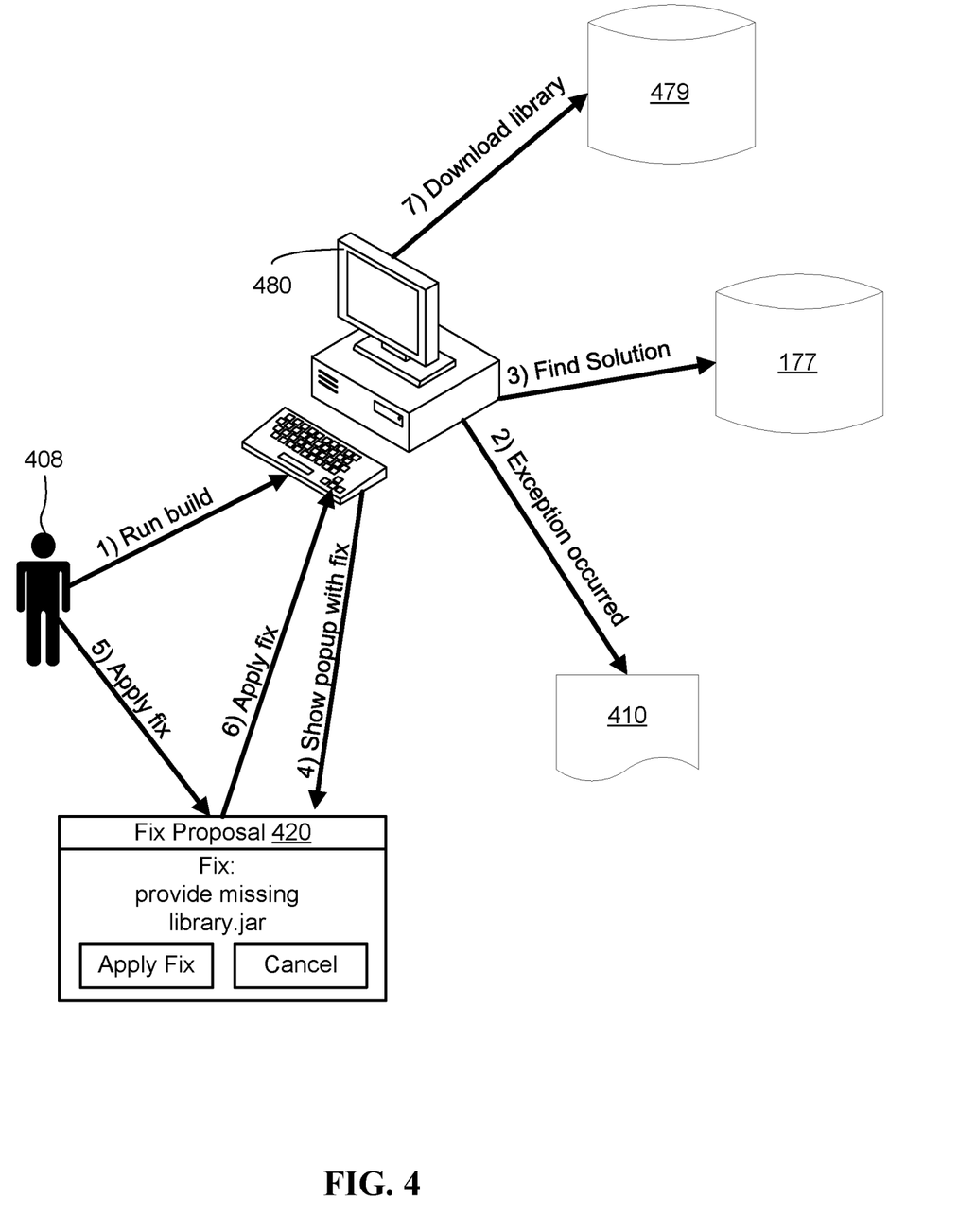
FIG. 4 depicts a diagram illustrating a method for using a knowledge base in accordance with the present disclosure.

FIG. 4 is a diagram illustrating a method for using a knowledge base 177, in accordance with the present disclosure.

Steps 1 and 5 describe a method from a user perspective and steps 2, 3, 4, 6, and 7 describe the method from another perspective.

In step 1, a user 408 may run a build of a program such as program code in a development system 480. In response to that, the development system 480 may determine in step 2 that an exception, as indicated by exception description 410, occurred with program code. The exception description 410 may be an error (e.g., java.lang.class org.hibernate.hql java.lang.class notfoundexception). Thus, in step 3, the development system 480 may look up for a solution of the exception in the knowledge base 177. In step 4, the development system 480 may render or display a popup 420 indicating a fix proposal of the exception. The fix proposal may be based on the solution obtained from the knowledge base 177. In step 5, the user 408 may trigger the application of the fix suggested by the development system, and the development system 480 may execute the fix in step 6. In step 7, the development system 480 may download a missing library that caused the exception in a remote library repository 479.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for cause analysis of configuration exceptions during the execution of computer programs on a computer, the method comprising:

executing an object code of a first program on the computer, the object code built before execution;

extracting exception information associated with a configuration exception, the configuration exception occurring during execution of the object code of the first program on the computer, wherein the configuration exception interrupts the flow of program execution of the first program;

looking up a set of possible causes from a knowledge base, wherein looking up the set of possible causes is based on context information related to the first program, wherein the context information includes a version of a development tool that was changed before execution of the first program, wherein the context information includes changes recorded from a timestamp of a last successful execution of the first program, wherein the context information is augmented by one or more time-dependent tags, wherein looking up the set of possible causes comprises calculating a first similarity metric from the context information, wherein the calculating is performed by a cognitive system configured to utilize unsupervised learning with clustering; and providing, concurrently with the configuration exception and based on the set of possible causes, a solution from the knowledge base, wherein the solution is based on confidence levels of machine learning, wherein the solution is improved based on provided confirmation information.

2. The method of claim 1, wherein the context information comprises at least one of characteristic of an execution environment where the first program is executed, characteristic of a development environment applied to generate the first program, or the object code of the first program.

3. The method of claim 1, wherein the context information comprises change information, the change information describing at least one change carried out on an execution environment or a development environment or on the object code of the first program.

4. The method of claim 1, wherein the first similarity metric from the context information is related to the first program and further context information stored in the knowledge base and associated with a possible cause stored in the knowledge base.

5. The method of claim 4, wherein looking up the possible causes comprises calculating a second similarity metric from the extracted exception information and further exception information stored in the knowledge base and associated with the possible cause stored in the knowledge base.

6. The method of claim 4, wherein the exception information comprises a character string and calculating the first similarity metric comprises determining a string similarity.

7. A computer program product comprising a computer-readable storage medium having computer-readable program code embodied therewith, the computer-readable program code executed by a processor configured to:
execute an object code of a first program on a computer, the object code built before execution;
extract exception information associated with a configuration exception, the configuration exception occurring during execution of the object code of the first program on the computer, wherein the configuration exception interrupts the flow of program execution of the first program;
retrieve a set of possible causes from a knowledge base, wherein retrieving the set of possible causes is based on context information related to the first program,
wherein the context information includes a version of a development tool that was changed before execution of the first program, wherein the context information includes changes recorded from a timestamp of a last successful execution of the first program, wherein the context information is augmented by one or more time-dependent tags,
wherein retrieving the set of possible causes comprises calculating a first similarity metric from the context information,
wherein the calculating is performed by a cognitive system configured to utilize unsupervised learning with clustering; and
provide, concurrently with the configuration exception and based on the set of possible causes, a solution from the knowledge base, wherein the solution is based on confidence levels of machine learning, wherein the solution is improved based on provided confirmation information.

8. The computer program product of claim 7, wherein the context information comprises at least one of characteristic of an execution environment where the first program is executed, characteristic of a development environment applied to generate the first program, or the object code of the first program.

9. The computer program product of claim 7, wherein the context information comprises change information, the change information describing at least one change carried out on an execution environment or a development environment or on the object code of the first program.

10. The computer program product of claim 7, wherein the first similarity metric from the context information is related to the first program and further context information stored in the knowledge base and associated with a possible cause stored in the knowledge base.

11. The computer program product of claim 10, wherein retrieve the possible causes comprises calculating a second similarity metric from the extracted exception information and further exception information stored in the knowledge base and associated with the possible cause stored in the knowledge base.

12. The computer program product of claim 10, wherein the exception information comprises a character string and calculating the first similarity metric comprises determining a string similarity.

13. A system for cause analysis of configuration exceptions during the execution of computer programs, the system comprising:
a memory; and
a processor, the processor communicatively coupled to the memory, the processor configured to:
execute an object code of a first program, the object code built before execution;
extract exception information associated with a configuration exception, the configuration exception occurring during execution of the object code of the first program, wherein the configuration exception interrupts the flow of program execution of the first program;
obtain a set of possible causes from a knowledge base, wherein obtaining the set of possible causes is based on context information related to the first program,
wherein the context information includes a version of a development tool that was changed before execution of the first program, wherein the context information includes changes recorded from a timestamp of a last successful execution of the first program, wherein the context information is augmented by one or more tags,
wherein obtaining the set of possible causes comprises calculating a first similarity metric from the context information,
wherein the calculating is performed by a cognitive system configured to utilize unsupervised learning with clustering; and
provide, concurrently with the configuration exception and based on the set of possible causes, a solution from the knowledge base, wherein the solution is based on confidence levels of machine learning, wherein the solution is improved based on provided confirmation information.

14. The system of claim 13, wherein the context information comprises at least one of characteristic of an execution environment where the first program is executed, characteristic of a development environment applied to generate the first program, or the object code of the first program.

15. The system of claim 13, wherein the context information comprises change information, the change information describing at least one change carried out on an execution environment or a development environment or on the object code of the first program.

16. The system of claim 13, wherein the first similarity metric from the context information is related to the first program and further context information stored in the knowledge base and associated with a possible cause stored in the knowledge base.

17. The system of claim 16, wherein obtain the set of possible causes comprises calculating a second similarity metric from the extracted exception information and further exception information stored in the knowledge base and associated with the possible cause stored in the knowledge base.

18. The system of claim 16, wherein the exception information comprises a character string and calculating the first similarity metric comprises determining a string similarity.

19. The system of claim 13, wherein the development tool is not present on the system.

20. The system of claim 13, wherein the one or more tags include at least one time-dependent tag.

* * * * *